United States Patent
Proefke et al.

(10) Patent No.: US 6,653,747 B1
(45) Date of Patent: Nov. 25, 2003

(54) ELECTRONIC KEY SYSTEM INCLUDING IGNITION AND TRANSMISSION CONTROL

(75) Inventors: David T. Proefke, Madison Heights, MI (US); Thomas E. Utter, Royal Oak, MI (US); Robert C. Baillargeon, Utica, MI (US); Thomas W. Pfeffer, Rochester, MI (US); Jeffrey R. Coil, Milford, MI (US); Andrew C. Brenz, Lake Orion, MI (US); Kenneth P. Orlando, Sterling Hghts, MI (US); Tejas B. Desai, Sterling Hghts, MI (US); Christian O. Johnson, Rochester Hills, MI (US); Ronald J. Plichta, Rochester Hills, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 216 days.

(21) Appl. No.: 09/678,033

(22) Filed: Oct. 3, 2000

Related U.S. Application Data

(60) Provisional application No. 60/157,592, filed on Oct. 4, 1999.

(51) Int. Cl.[7] .............................. B60R 25/04; F02P 9/00; H02G 3/00
(52) U.S. Cl. .................................................... 307/10.6
(58) Field of Search .............................. 307/10.1–10.8; 340/825.69

(56) References Cited

U.S. PATENT DOCUMENTS

| | | | | |
|---|---|---|---|---|
| 4,673,914 A | * | 6/1987 | Lee ............................. | 180/287 |
| 5,157,389 A | * | 10/1992 | Kurozu et al. ............. | 307/10.2 |
| 5,343,077 A | * | 8/1994 | Yoshida et al. ............. | 180/287 |
| 5,751,073 A | * | 5/1998 | Ross ........................ | 123/179.2 |
| 6,172,430 B1 | * | 1/2001 | Schmitz et al. ............. | 180/287 |
| 6,259,362 B1 | * | 7/2001 | Lin ............................ | 307/10.1 |

FOREIGN PATENT DOCUMENTS

| | | | | |
|---|---|---|---|---|
| DE | 197 47 732 A1 | 5/1999 | | |
| DE | 19755093 | 6/1999 | | |
| EP | 0 924 370 A2 | 6/1999 | | |
| FR | 2573466 | 5/1986 | | |
| FR | 2759109 | 8/1998 | | |
| FR | 2 767 767 | 3/1999 | | |
| FR | 2776412 | 9/1999 | | |
| JP | 11-91507 | * 4/1999 | ........... | B60R 25/04 |
| JP | 11091507 | 4/1999 | | |
| WO | 9511498 | 4/1995 | | |
| WO | WO 99/21741 | * 5/1999 | ........... | B60R 25/04 |
| WO | WO 0125063 | * 4/2001 | ........... | B60R 25/04 |

OTHER PUBLICATIONS

International Search Report mailed Feb. 19,2001.

* cited by examiner

*Primary Examiner*—Gregory J. Toatley, Jr.

(57) ABSTRACT

A vehicle access system that includes an electronic key ensures that the vehicle transmission is in a proper condition before power to the selected vehicle components is turned off. A control panel within the vehicle allows a driver to activate a switch indicating a desire to turn off the vehicle engine. A controller first determines whether a valid authentication code is received from a passive signaling device. Once validation is complete, the controller turns off the engine. Next, the controller determines that the vehicle is in the appropriate gear. If the transmission must be switched to the appropriate gear, the controller provides an indication to the driver that the transmission must be switched before the power to the accessory components will be turned off.

15 Claims, 1 Drawing Sheet

ELECTRONIC KEY SYSTEM INCLUDING IGNITION AND TRANSMISSION CONTROL

RELATED APPLICATIONS

This application claims priority to U.S. Provisional Application No. 60/157,592, which was filed on Oct. 4, 1999.

BACKGROUND OF THE INVENTION

Keyless vehicle access systems are increasingly incorporated into modern day vehicles. One example includes a keyless entry system where a vehicle owner utilizes manual switches on a keyfob to accomplish functions such as unlocking the vehicle doors or trunk or remotely turning on the ignition of the vehicle.

A more recently proposed system includes a passive remote signaling device such as a card that is carried by a vehicle owner. The system controller on the vehicle receives signals from the passive signaling device without requiring any manual activation by the user. Such passive signaling devices are proposed to be used as electronic keys to allow a driver to start a vehicle by pushing a button rather than by placing a physical key into a conventional ignition lock.

In such a system manual switches within the vehicle interior allow the driver to choose to turn on or off the ignition. The system controller only responds to such switch activation when an appropriate authentication code is received from a passive signaling device present in the interior of the vehicle.

While such systems simplify the task of operating a vehicle, in part because it does not require the driver to carry around a mechanical key, there are drawbacks. One example drawback is that the simplicity with which a driver can turn on or off the ignition (i.e., by activating a switch) makes it possible for the drive to inadvertently signal to the controller that the driver intends to turn off the vehicle engine. Additionally, as more simplified switch controls are incorporated into such a system, the possibility exists for a driver to turn off the vehicle engine when the vehicle transmission is still in drive (in the case of an automatic transmission) or in gear (in the case of a manual transmission). Neither of the two just-mentioned possibilities are desirable.

This invention addresses the need for providing more controlled operation of a vehicle access system that does not require a mechanical key to operate the vehicle ignition. This invention provides a solution that avoids the drawbacks mentioned above.

SUMMARY OF THE INVENTION

In general terms, this invention is a vehicle access system that permits operation of the vehicle ignition without requiring a mechanical key. A passive signaling device provides an authentication code. A selectively activated switch allows the driver to turn the vehicle ignition on or off. A controller responds to activation of the switch only when a proper authentication code is received from the passive signaling device. The controller preferably turns off the engine but will only turn off all vehicle accessories if the vehicle transmission is in a preselected gear.

The controller preferably provides an indication to the driver that the transmission is not in the preselected gear. In one example, a visual indication is provided to the driver. In another example, an audible indication is provided to the driver.

The various features and advantages of this invention will become apparent to those skilled in the art from the following detailed description of the currently preferred embodiment. The drawings that accompany the detailed description can be briefly described as follows.

DETAILED DESCRIPTION OF A PREFERRED EMBODIMENT

Figure 1:
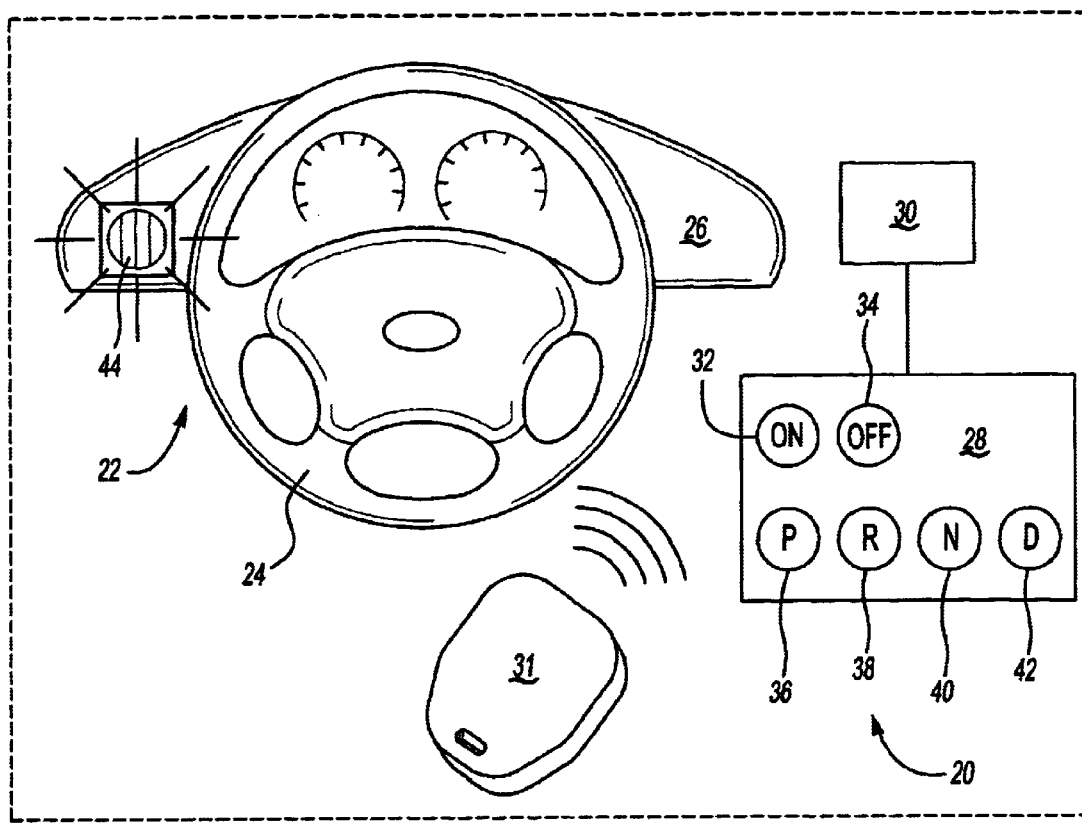
FIG. 1 schematically illustrates a system designed according to this invention.

A vehicle access system 20 is schematically illustrated along with selected components of a vehicle interior 22. A steering wheel 24 and instrument panel 26 operate in conventional manner except as may be indicated below. A driver interface control panel 28 includes a plurality of switches that are selectively activated to send a signal to a system controller 30, which is programmed to accomplish the desired function based upon the chosen switch.

The controller 30 only responds to activation of one of the switches on the control panel 28 when a proper authentication code has been received from a passive signaling device 31. In the illustrated embodiment, the passive signaling device 31 is a card that can be conveniently carried about by the vehicle owner. Other forms of passive signaling devices, which are sometimes referred to as electronic keys, are equally useful in a system designed according to this invention.

The control panel 28 preferably includes a plurality of switches including an ignition on switch 32 to start the vehicle. An ignition off switch 34 permits the driver to turn off the vehicle engine when desired. In one example, the on and off switches are incorporated into a single switch and the controller 30 takes a switch activation as an indication to change the current state of the vehicle engine. For example, if the vehicle engine is running and the combined on and off switch were activated, the controller 30 determines that the driver desires to turn off the engine.

Other switches on a control panel 28 includes switches to choose the state of the vehicle transmission. Switches for an automatic transmission are illustrated including a park switch 36, a reverse switch 38, a neutral switch 40 and a drive switch 42. While the illustrated switches pertain to an automatic transmission, this invention is equally applicable to vehicles that incorporate a manual transmission.

Whenever the driver indicates a desire to turn off the vehicle engine by activating switch 34, the controller 30 first determines whether a proper authentication code is available from the passive signaling device 31. In one example, the controller also determines whether the passive signaling device 31 is within the interior of the vehicle. Next the controller determines whether the transmission is in the appropriate gear for the engine to be turned off. If the transmission is not in park (or reverse in the case of a manual transmission) then the controller 30 preferably turns off the engine and provides an indication to the driver that the transmission must be shifted before power to the vehicle accessories will be turned off.

An example indicator 44 provides an audible indication to the driver to shift the transmission before the vehicle engine will be turned off. Visual indicators are also useful with this invention and may be incorporated, for example, in a display on the instrument panel 26 or by lighting one or more of the switches on the control panel 28. In one example, the park switch 36 illuminates and flashes to indicate to the driver that the transmission must be shifted to park before the vehicle engine will be turned off.

Once the controller 30 determines that the vehicle is in the appropriate gear, then the controller turns off the power to the accessories.

In another example, the controller will not turn the engine off unless the transmission is in the appropriate gear. The currently preferred arrangement, however, turns off the vehicle engine but continues to power all vehicle accessories.

Figure 2:
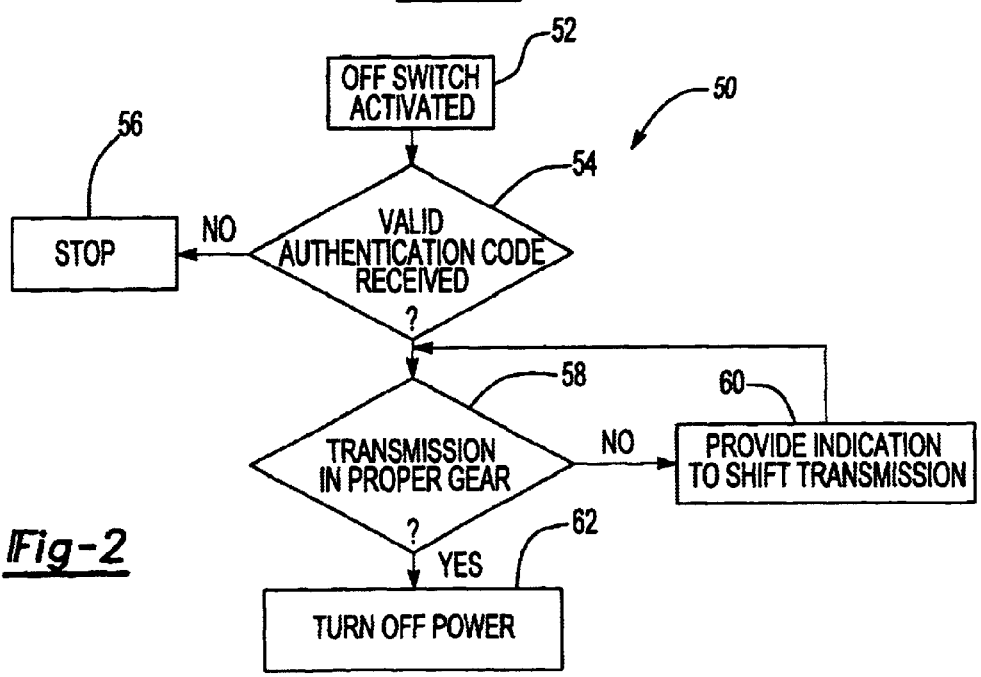
FIG. 2 is a flowchart diagram illustrating a method of this invention.

One method of this invention is illustrated in the flowchart 50 of FIG. 2. The flowchart indicates the logical flow of the various steps taken by the controller 30 for determining that it is acceptable to turn off the vehicle engine responsive to a user activating the switch 34. The controller detects switch activation at 52 and then checks to determine whether a valid authentication code has been received at 54. If no code is received, the controller stops the procedure at 56. When a proper authentication code is received, the controller determines whether the transmission is in the proper gear at 58. In the event that the transmission is not yet in the proper gear, the controller causes an indication to be provided at 60 telling the user to shift the transmission into the appropriate gear. Once the transmission is in the appropriate condition, the controller turns off the power to the accessories at 62. Given this description, those skilled in the art will be able to program a commercially available controller to perform the method of this invention.

The preceding description is exemplary rather than limiting in nature. Variations and modifications to the disclosed embodiments may become apparent to those skilled in the art that do not necessarily depart from the purview and spirit of this invention. The scope of protection given to this invention can only be determined by studying the following claims.

We claim:

1. A system for controlling a vehicle that has an ignition that is operable without requiring a mechanical key, comprising:
   a portable passive signaling device that provides an authentication code;
   an off switch supported in an interior of the vehicle for turning the vehicle engine off; and
   a controller that responds to activation of the off switch when the authentication code is received from the portable passive signaling device, the controller determines the current gear of the vehicle transmission and only turns off power to selected vehicle components when the transmission is in a preselected gear.

2. The system of claim 1, including an indicator supported in the interior of the vehicle to provide the driver with an indication that the transmission must be shifted to the preselected gear before the power will be turned off.

3. The system of claim 2, wherein the indicator provides an audible indication.

4. The system of claim 2, wherein the indicator provides a visual indication.

5. The system of claim 2, including a push button that activates the off switch and wherein the indicator is supported on the push button.

6. The system of claim 1, wherein the controller receives the authentication code whenever the portable passive signaling device is within the interior of the vehicle.

7. The system of claim 1, wherein the passive signaling device comprises a card.

8. The system of claim 1, wherein the controller will not turn off the vehicle engine unless the transmission is in the pre-selected gear.

9. The system of claim 1, wherein the controller turns off the engine regardless of the current gear of the transmission.

10. A method of controlling a vehicle ignition without requiring a mechanical key, comprising the steps of:
    (A) determining whether a driver has indicated a desire to turn off the vehicle engine;
    (B) determining whether a valid authentication code from a portable passive signaling device is received;
    (C) determining whether a current vehicle transmission gear is a preselected gear; and
    (D) turning off power to selected vehicle components only when the determinations of steps (A), (B) and (C) are positive.

11. The method of claim 10, including providing an indication to a driver that the transmission must be shifted to the preselected gear before the power will be turned off.

12. The method of claim 11, including providing an audible indication to the driver.

13. The method of claim 11, including providing a visible indication to the driver.

14. The method of claim 11, wherein step (A) includes determining whether the driver has activated an off switch and wherein the indication is provided by illuminating a button associated with the switch.

15. A method of controlling a vehicle ignition without requiring a mechanical key, comprising the steps of:
    determining whether a driver has indicated a desire to turn off the vehicle engine;
    determining whether a valid authentication code from a portable passive signaling device is received;
    determining whether a transmission of the vehicle is in park; and
    turning off power to electrically powered accessories on the vehicle only when the driver has indicated the desire to turn off the vehicle engine, the valid authentication code is received and the vehicle transmission is in park.

* * * * *